US012601302B2

(12) United States Patent

Peltier et al.

(10) Patent No.: US 12,601,302 B2
(45) Date of Patent: Apr. 14, 2026

(54) TURBOMACHINE COMPRISING A SPEED REDUCER HAVING ATTACHMENT FLANGES COUPLED BY A GEAR COUPLING

(71) Applicant: SAFRAN TRANSMISSION SYSTEMS, Colombes (FR)

(72) Inventors: Jordane Emile Andre Peltier, Moissy-cramayel (FR); Boris Pierre Marcel Morelli, Moissy-Cramayel (FR); Patrice Julien Ptaszynkski, Moissy-cramayel (FR); Pierre-Damien Tune, Moissy-cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 57 days.

(21) Appl. No.: 18/433,185

(22) Filed: Feb. 5, 2024

(65) Prior Publication Data

US 2025/0075629 A1     Mar. 6, 2025

(30) Foreign Application Priority Data

Feb. 6, 2023 (FR) ...................................... 2301107

(51) Int. Cl.
| | |
|---|---|
| *F02C 7/36* | (2006.01) |
| *F16H 1/28* | (2006.01) |
| *F16H 55/17* | (2006.01) |

(52) U.S. Cl.
CPC ................. *F02C 7/36* (2013.01); *F16H 1/28* (2013.01); *F16H 55/17* (2013.01); *F05D 2260/4031* (2013.01); *F16H 2055/176* (2013.01)

(58) Field of Classification Search
CPC ... F16H 1/28; F16H 1/34; F16H 57/08; F16H 57/082; F02C 7/36; F05D 2260/4031; F05D 2260/40311
See application file for complete search history.

(56) References Cited

U.S. PATENT DOCUMENTS

| | | | | |
|---|---|---|---|---|
| 10,274,047 | B2 * | 4/2019 | Matsuoka | ............... F16H 57/08 |
| 10,399,669 | B2 * | 9/2019 | Viennot | ................ B64C 13/341 |

(Continued)

FOREIGN PATENT DOCUMENTS

DE        102008035155 A1      3/2009

OTHER PUBLICATIONS

Preliminary Research Report received for French Application No. 2301107, mailed on Jul. 21, 2023, 3 pages (1 page of French Translation Cover Sheet and 2 pages of original document).

*Primary Examiner* — Justin D Seabe
(74) *Attorney, Agent, or Firm* — WOMBLE BOND DICKINSON (US) LLP

(57) ABSTRACT

A speed reducer for a turbomachine for an aircraft, of longitudinal axis X, the speed reducer including an external ring gear and a ring gear carrier attached to the external ring gear which comprises a first attachment flange extending radially outwards and attached to a second attachment flange of the ring gear carrier by attachment members. The turbomachine including a gear coupling with axial coupling teeth including a first series of teeth engaging with a second series of complementary teeth, a portion of the first attachment flange including a portion of the gear coupling, the attachment members being arranged so as to clamp the first and second attachment flanges and circumferentially hold each axial tooth of the first series of teeth between two axial teeth of the second series of complementary teeth.

16 Claims, 9 Drawing Sheets

(56) References Cited

U.S. PATENT DOCUMENTS

| | | | | |
|---|---|---|---|---|
| 10,487,917 | B2 * | 11/2019 | Chmylkowski | .......... F02C 7/36 |
| 10,704,669 | B2 * | 7/2020 | Charrier | ............. F16H 57/0427 |
| 2009/0062058 | A1 * | 3/2009 | Kimes | ...................... F16H 1/28 |
| | | | | 475/344 |
| 2018/0038448 | A1 | 2/2018 | Matsuoka et al. | |

* cited by examiner

TURBOMACHINE COMPRISING A SPEED REDUCER HAVING ATTACHMENT FLANGES COUPLED BY A GEAR COUPLING

FIELD OF THE INVENTION

The present invention relates to the general field of the aeronautic. In particular, it refers to a mechanical speed reducer with attachment flanges coupled by at least one gear coupling.

TECHNICAL BACKGROUND

The prior art comprises the documents US-B1-2018038448 and DE-A1-102008035155.

The role of a mechanical reduction gear is to modify the speed and torque ratio between the input axle and the output axle of a mechanical system.

The new-generation turbomachines with double-flow, particularly those with a high bypass ratio, comprise a mechanical reduction gear to drive the shaft of a fan. The usual purpose of the speed reducer is to transform the rotational speed referred to as fast rotational speed of the shaft of a power turbine into a slower rotation speed for the shaft driving the fan.

Such a reduction gear comprises a central sprocket, referred to as sun gear, a ring gear and sprockets referred to as planet gears, which are engaged between the sun gear and the ring gear. The planet gears are held by a chassis referred to as planet carrier. The sun gear, the ring gear and the planet carrier are planetary because their axes of revolution coincide with the longitudinal axis X of the turbomachine. The planet gears each have a different axis of revolution and are equally distributed on the same operating diameter around the axis of the planetary. These axes are parallel to the longitudinal axis X.

There are several reduction gear architectures. In the prior art of the dual-flow turbomachines, the reduction gears are of the planetary or epicyclic type. In other similar applications, there are architectures referred to as differential or "compound".

In a planetary speed reducer, the planet carrier is stationary and the ring gear is the output shaft of the device which rotates in the opposite orientation of the sun gear.

In an epicyclic speed reducer, the ring gear is stationary and the planet carrier is the output shaft of the device which rotates in the same orientation as the sun gear.

In a differential speed reducer, no element is attached in rotation. The ring gear rotates in the opposite orientation of the sun gear and of the planet carrier.

The speed reducers can consist of one or more meshing stages. This meshing is ensured in different ways such as by contact, friction or magnetic field.

There are several types of contact meshing such as straight, helical or herringbone toothings.

FIG. 1 shows a speed reducer 1A with epicyclic gearing. The speed reducer 1A comprises a stationary ring gear 2A connected to a stationary casing or stator 3A of the turbomachine via a ring gear carrier 4A. The speed reducer 1A comprises planet gears 5A which drive in rotation a planet carrier 6A. The latter is attached to the fan shaft and can rotate about the longitudinal axis of the turbomachine. The ring gear 2A comprises a first attachment flange 7A extending radially outwards and attached to a second attachment flange 8A of the ring gear carrier 4A by means of a bolted connection. The attachment flanges 7A, 8A each comprise a surface and these surfaces are pressed together by the screws 9A of the bolted connection.

The passage of the torque is transmitted by friction between these surfaces and is limited to the iso-diameter of the implant. Increasing the diameter of the attachment flanges can be a solution for increasing the passage capacity of the torque. However, on the one hand, the number of screws to be implanted to these flanges can be limited and, on the other hand, this could have a direct impact on the diameter of the speed reducer and the integration of the latter into an already restricted space in the turbomachine. On the other hand, the ring gear carrier 4A has a gooseneck which can impede the access to the screws of the bolted connection.

In addition, the ring gear carrier can comprise bellows to centre the ring gear and to connect the ring gear 2A to the casing so as to limit the overloads due to the displacements and misalignments of various members in the turbomachine. The ring gear carrier is therefore complex to manufacture and assembly can be tedious.

There is a need to resolve some or all of the above disadvantages.

SUMMARY OF THE INVENTION

The aim of the present invention is to provide a simple and economical solution for increasing the capacity for transmitting a torque towards the stator of the turbomachine.

This objective is achieved in accordance with the invention by means of a speed reducer for a turbomachine, in particular for an aircraft, having a longitudinal axis X, the speed reducer comprising a sun gear sprocket, planet gear sprockets, an external ring gear, and a ring gear carrier attached to the external ring gear, the planet gear sprockets being in mesh on the one hand with the sun gear sprocket and on the other hand with the external ring gear, and the external ring gear comprising a first attachment flange extending radially outwards and being attached to a second attachment flange of the ring gear carrier by attachment members, the first attachment flange and the second attachment flange forming an attachment assembly, and in that the attachment assembly comprises at least one gear coupling with axial coupling teeth comprising a first series of axial coupling teeth intended to engage with a second series of complementary axial coupling teeth, the attachment members being arranged so as to clamp the first and second attachment flanges together and circumferentially hold each tooth of the first series of axial coupling teeth between two teeth of the second series of complementary axial coupling teeth.

Thus, this solution allows to achieve the above-mentioned objective. In particular, this coupling allows to provide a significant torque passage increase (of the order of 50%) on large average diameters. Thee torque passage is transmitted by friction between the teeth, which provide larger contact surfaces. In addition, the attachment of the attachment flanges by attachment members allows to apply the axial force required in this type of coupling to press at least the two attachment flanges together. The gear coupling allows to reduce the number of attachment members by around 90%, which means less weight and simpler assembly. The reliability of such a configuration is enhanced.

The speed reducer also comprises one or more of the following characteristics, taken alone or in combination:
the external ring gear is formed by a front half-ring gear and a rear half-ring gear, the front half-ring gear comprising a front radial half-flange and the rear half-ring gear comprising a rear radial half-flange, the front radial half-flange and the rear radial half-flange forming the first attachment flange, the rear radial half-flange of the rear half-ring gear being connected to the second attachment flange by a gear coupling with axial coupling teeth, the rear radial half-flange of the rear half-ring gear comprising the first series of axial coupling teeth and the second attachment flange comprising the second series of complementary axial coupling teeth.

the external ring gear is formed by a front half-ring gear and a rear half-ring gear, the front half-ring gear comprising a front radial half-flange and the rear half-ring gear comprising a rear radial half-flange, the front radial half-flange and the rear radial half-flange forming the first attachment flange, the front and rear radial half-flanges being connected together by a gear coupling with axial teeth, one of the front and rear radial half-flanges comprising the first series of axial coupling teeth and the other of the front and rear radial flanges comprising the second series of complementary axial coupling teeth.

the first attachment flange and the second attachment flange respectively comprise first and second axial attachment orifices through which the attachment members pass, the first and second axial attachment orifices being arranged circumferentially around the longitudinal axis.

the attachment members comprise axial screws or axial bolts passing through the first and second attachment orifices.

several teeth of the first or second series of axial coupling teeth are arranged between two circumferentially adjacent first or second attachment orifices around the longitudinal axis, the number of first or second attachment orifices being between 5 and 10.

the ring gear carrier comprises a bellow.

the first flange and the second flange each comprise axial attachment teeth through which attachment orifices designed to receive attachment members pass.

the axial attachment teeth have, on the one hand, a tooth height measured radially with respect to the longitudinal axis and, on the other hand, a tooth width measured in a direction transverse to the tooth height, the width of each of the axial attachment teeth being greater than the tooth width of the axial coupling teeth.

the axial coupling teeth extend over the entire radial height of the first and second attachment flanges.

one of the front and rear half-ring gears comprises a leg extending along the longitudinal axis and intended to be housed in a recess of complementary shape in the other of the front and rear half-ring gears.

the ring gear is connected to a casing of the turbomachine and unmovable in rotation with respect to the longitudinal axis, the ring gear is connected to a shaft of the turbomachine and is movable in rotation about the longitudinal axis.

the attachment assembly comprises piercings or holes intended for the evacuation of the lubricant and attachment members between the parts.

The invention also relates to a turbomachine, in particular for an aircraft, having a longitudinal X axis and a speed reducer as mentioned above.

The invention also concerns an aircraft equipped with such a turbomachine.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
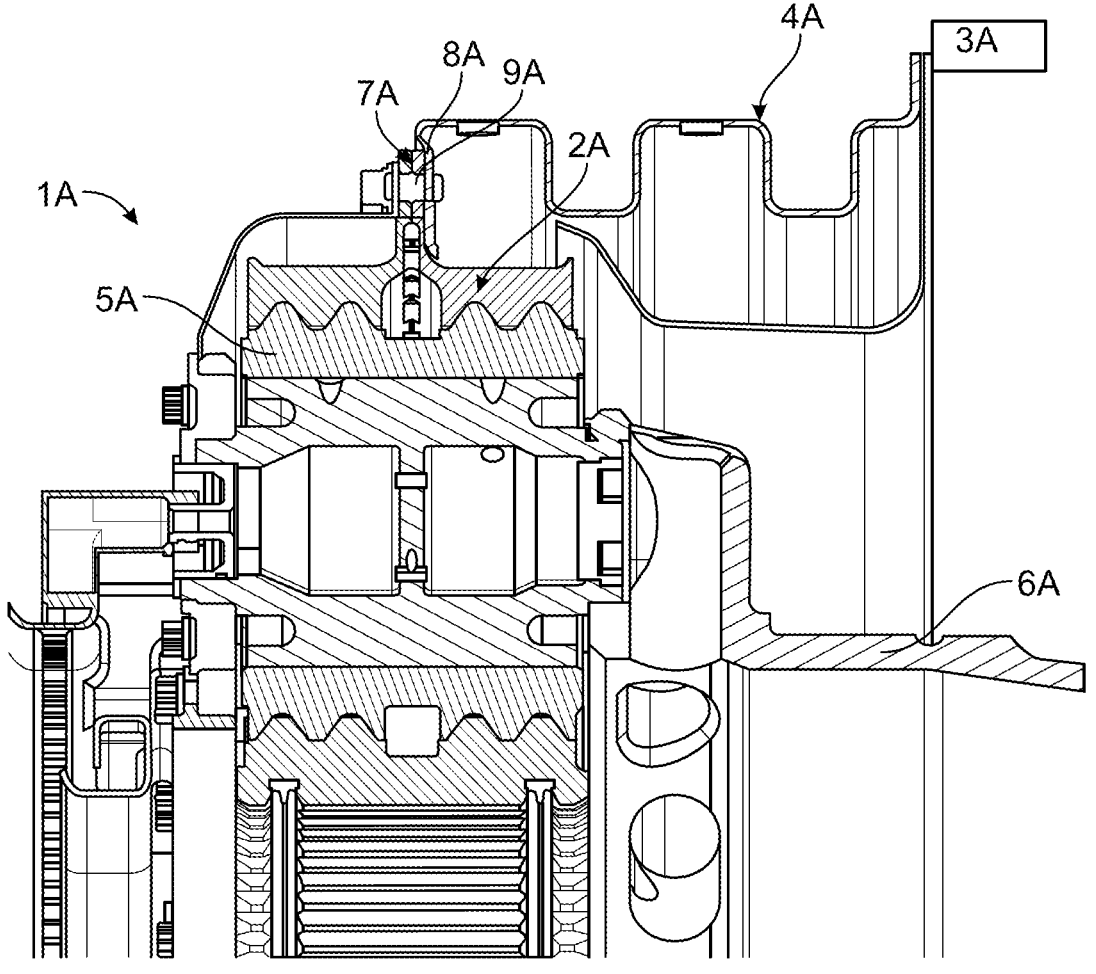
FIG. 1 shows a mechanical reduction gear of a turbomachine according to the prior art.

FIG. 1 shows an axial cross-section of a mechanical speed reducer intended to equip a turbomachine, which has already been described.

Figure 2:
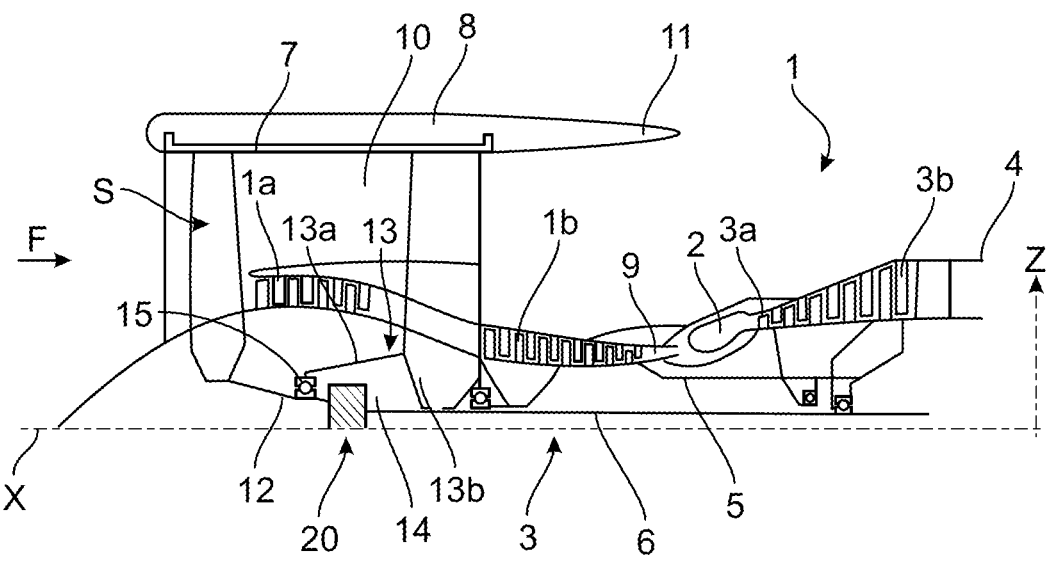
FIG. 2 shows an example of a turbomachine according to the invention.

FIG. 2 shows a turbomachine 1 with a longitudinal axis X. The turbomachine 1 shown is a turbomachine with double-flow 1 intended to be mounted on an aircraft. Of course, the turbomachine can be a single-flow turbojet engine or a turboprop equipped with a single unducted propeller or a doublet of unducted, counter-rotating propellers, referred to as an "open rotor". The invention can be applied to other fields in which a mechanical speed reducer is used.

In the present invention, the terms "upstream" and "downstream" are defined in relation to the circulation of the gases in the turbomachine and here along the longitudinal axis X and in FIG. 1 from left to right.

The turbomachine 1 comprises, in conventional fashion and from upstream to downstream, a fan S, a low-pressure compressor 1a, a high-pressure compressor 1b, an annular combustion chamber 2, a high-pressure turbine 3a, a low-pressure turbine 3b and an exhaust nozzle 4. The high-pressure compressor 1b and the high-pressure turbine 3a are connected by a high-pressure shaft 5 and together form a high-pressure (HP) body. The low-pressure compressor 1a and low-pressure turbine 3b are connected by a low-pressure shaft 6 and together form a low-pressure (LP) body.

The fan S is ducted by a fan casing 7 carried by an external nacelle 8. The fan S generates, from an air flow F entering the fan, a primary air flow which circulates in a primary duct 9 opening into the exhaust nozzle 4 and a secondary air flow which circulates in a secondary duct 10, around the primary duct 9, opening into an ejection nozzle 11.

The fan S is driven by a fan shaft 12 which is driven by the low-pressure shaft 6, for example by means of a speed reducer 20. The latter is generally of the planetary or epicyclic type.

In the present embodiment, the turbomachine is equipped with a speed reducer 20 consisting of a gear train and referred by the acronym RGB for "Reduction Gear Box".

The speed reducer 20 is positioned in the upstream portion of the turbomachine following the circulation of the gases in the turbomachine. A stationary structure 13 comprising schematically, here, an upstream portion 13a and a downstream portion 13b, composes the engine casing 16 or stator and is arranged so as to form an enclosure 14 surrounding the reduction gear 20. The engine casing 16 may be the inlet casing of the turbomachine, for example. A lubricant mist prevails in the enclosure 14. Advantageously, but without limitation, this enclosure 14 is closed upstream by seals at the level of an upstream bearing 15 allowing the fan shaft 12 to pass through, and downstream by seals at the level of the low-pressure shaft 6 to pass through.

Figure 3:
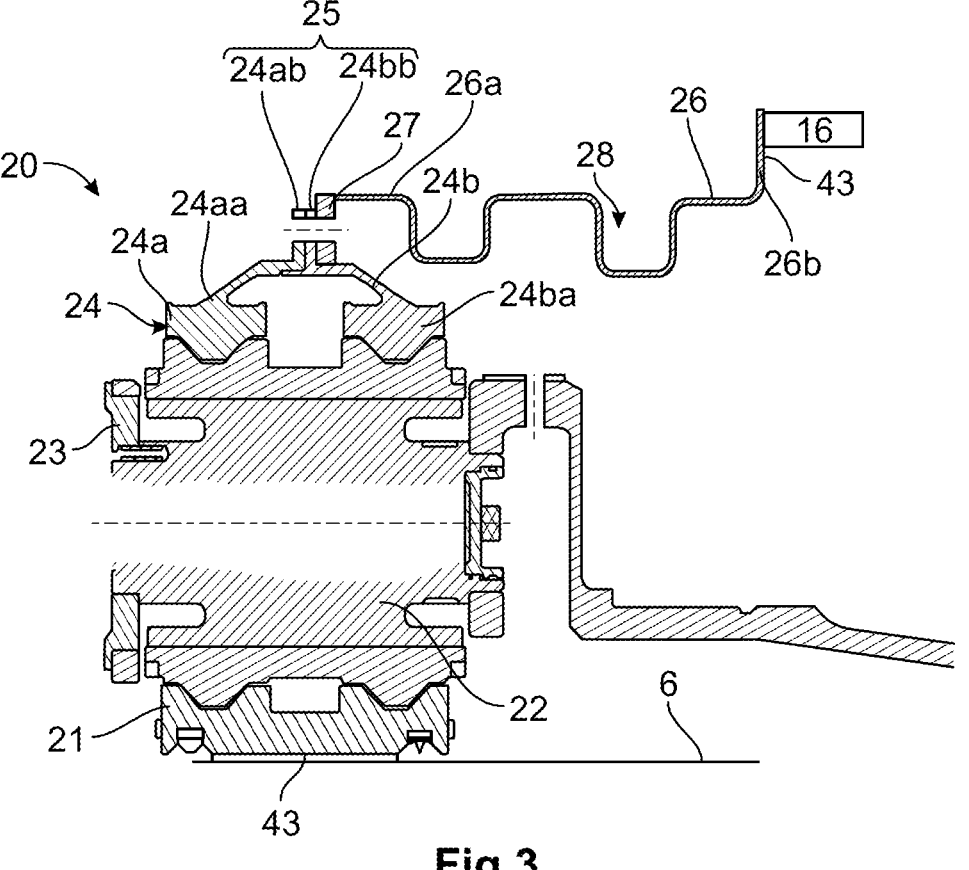
FIG. 3 is a detailed view of an example of a speed reducer according to the invention.

With reference to FIG. 3, the speed reducer 20 is of the epicyclic type. The latter comprises three elements: a sun gear sprocket 21, planet gear sprockets 22 and a planet carrier 23, which are movable in rotation. The speed of rotation of one of these elements depends in particular on the difference in speeds of the other two elements.

On the input side, the speed reducer 20 is connected to the low-pressure shaft 6, for example by means of splines 39. The latter advantageously extend parallel to the longitudinal axis X. The low-pressure shaft 6 thus drives the sun gear 21 (or internal sun gear). Typically, the sun gear 21, whose axis of rotation coincides with that of the longitudinal axis X of the turbomachine, drives the planet gears 22, which are equally spaced on the same diameter around the longitudinal axis of rotation X. This diameter is equal to twice the operating centre distance between the sun gear and the planet gears. The number of planet gears is generally defined as between three and seven for this type of application.

Advantageously, the sun gear 21 is secured in rotation to the low-pressure shaft 6 and the planet carrier 23 is secured in rotation to the fan shaft 12.

The assembly of the planet gears 22 is held by a chassis referred to as planet carrier 23. Each planet gear 22 rotates around its own axis. Each planet gear 22 meshes with an external ring gear 24 (or external sun gear).

The external ring gear 24 is stationary or rotationally immobile with respect to the longitudinal axis X.

On the output side, the assembly the planet gears 22 drive in rotation the planet carrier 23 about the axis X of the turbomachine. The external ring gear 24 is attached to a casing of the turbomachine or stator (such as casing 16) via a ring gear carrier 26, described later. The planet carrier is attached and secured in rotation to the fan shaft 12.

Alternatively, not shown, the speed reducer 20 comprises a gear of the planetary type. In this case, the input of the speed reducer 20 is coupled to the low-pressure shaft 6, while the output of the speed reducer 20 is coupled to the fan shaft 12. In particular, the external ring gear 24 is secured in rotation to the fan shaft 12 about the longitudinal axis X. The planet gears, for example five in number, are carried by the planet carrier 23, which in this case is mounted stationary. The planet carrier 23 is secured to the casing 16. In this way, the planet gears 22 each have teeth that mesh with those of the sun gear sprocket 21, in the form of a toothed wheel, and with the external ring gear 24, which is equipped with internal toothings. In operation, the sun gear sprocket 21 is driven in rotation by the low-pressure shaft 6 at a first rotational speed. The planet gears 22 are driven in rotation by the sun gear sprocket 21 about their axis at a second rotational speed. The external ring gear 24, which meshes with the planet gears 22, is driven in rotation about the longitudinal axis X and drives the fan shaft 12. The external ring gear 24 rotates at a third rotational speed and in the opposite orientation to that of the sun gear sprocket 21.

In the case of planetary or epicyclic reduction gears, each planet gear 22 is mounted so that it can rotate freely by means of a bearing (not shown), for example a rolling bearing or hydrodynamic bearing. Generally speaking, a hydrodynamic bearing is supplied with "low" pressures (usually less than 10 bar). The rotation of the bearing allows the oil wedge to build up pressure and separate the planet gears and the bearings. Each bearing is mounted on one of the axles of the planet carrier 23 and all the axles are positioned relative to each other using one or more structural chassis of the planet carrier 23. Each planet gear 22 meshes with external toothings of the sun gear 21 and internal toothings of the external ring gear 24. The internal toothings of the external ring gear 24 can be straight (parallel to the longitudinal axis), helical or herringbone-shaped.

There is a number of axles and bearings equal to the number of planet gears. For reasons of operation, assembly, manufacture, inspection, repair or replacement, the axles and the chassis may be separated into several parts.

For the same reasons mentioned above, the toothing of a speed reducer 20 can be split into several propellers.

Still referring to FIG. 3, the external ring gear 24 is separated into two half-ring gears 24a, 24b:

a front half-ring gear 24a consisting of a rim 24aa and a front radial attachment half-flange 24ab. The front propeller of the toothing of the reduction gear is located on the rim 24aa. This front propeller meshes with that of the planet gear 22 which meshes with that of the sun gear 21.

a rear half-ring gear 24b consisting of a rim 24ba and a rear radial attachment half-flange 24bb. The rear propeller of the toothing of the reduction gear is located on the rim. This rear propeller meshes with that of the planet gear 22 which meshes with that of the sun gear 21.

The attachment half-flange 24ab of the front half-ring gear 24a and the attachment half-flange 24b of the rear half-ring gear 24b form a first attachment flange 25 of the ring gear. The attachment flange 25 is annular and extends radially outwards.

Advantageously, and not restrictively, and as can be seen in FIG. 3, the half-ring gears are separated at the level of a median plane and the front and rear flanges have an internal surface on either side of this median plane or coinciding with this median plane. This also allows to centre the ring gear.

Of course, the external ring gear 24 can be formed in a single piece. In this case, the external ring gear 24 comprises a (single) first annular attachment flange 25 which extends radially outwards.

The external ring gear 24 of the planetary reducer 20 can have this same configuration in two half-ring gears or be formed from a single piece of material.

Still referring to FIG. 3, a ring gear carrier 26 connects the external ring gear 24 to the casing 16 of the turbomachine. The ring gear carrier 26 is used to transfer torque from the speed reducer 20 to the casing of the turbomachine. The ring gear carrier 26 can also be used to centre the external ring gear 24. Advantageously, the ring gear carrier 26 is annular and centred on the axis of the turbomachine. To this end, the ring gear carrier 26 comprises a second attachment flange 27 at a first end 26a. In this example, the latter extends radially inwards. Alternatively, the second attachment flange 27 of the ring gear carrier 26 extends radially outwards.

The ring gear carrier 26 advantageously comprises at a second end 26b a connecting flange 43 which is intended to be attached to an attachment part of the stator (such as the casing 16) of the turbomachine.

Advantageously, the ring gear carrier 26 comprises flexibility means 28 which are configured in such a way as, on the one hand, to limit the overloads in the turbomachine due to the displacements of certain members thereof and/or of the speed reducer 20 and, on the other hand, to obtain a uniform and stable distribution of dynamic loads. In the present example, the flexibility means 28 comprise at least one bellows. The ring gear carrier 26 comprises a segment equipped with several bellows.

Figure 4:
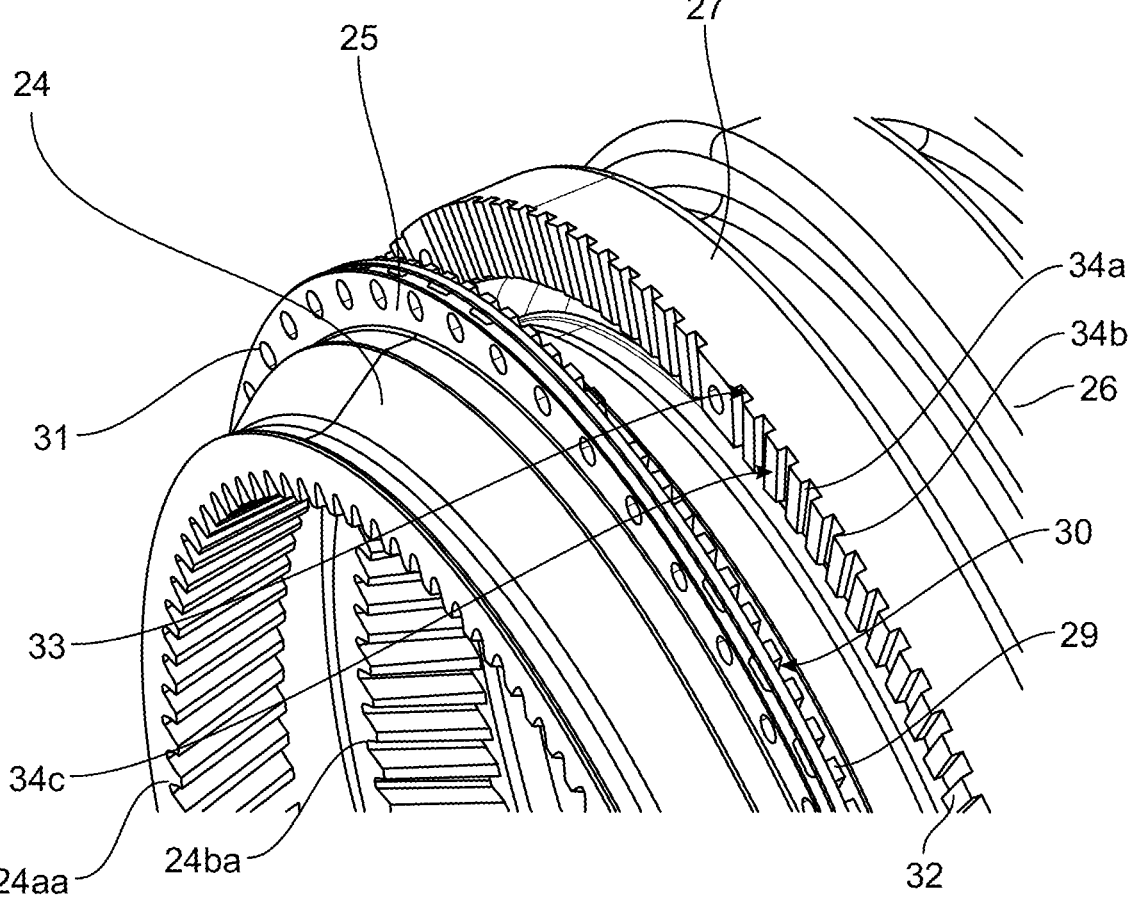
FIG. 4 shows a perspective view of an example of a coupling between two members of a speed reducer according to the invention.
Figure 5:
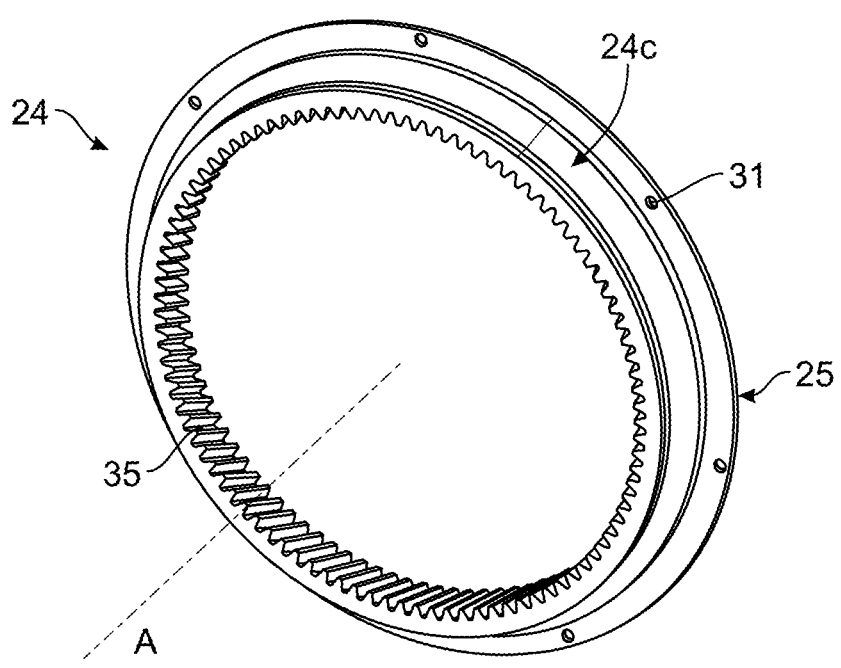
FIG. 5 is a perspective view of an example of a ring gear according to the invention.
Figure 6:
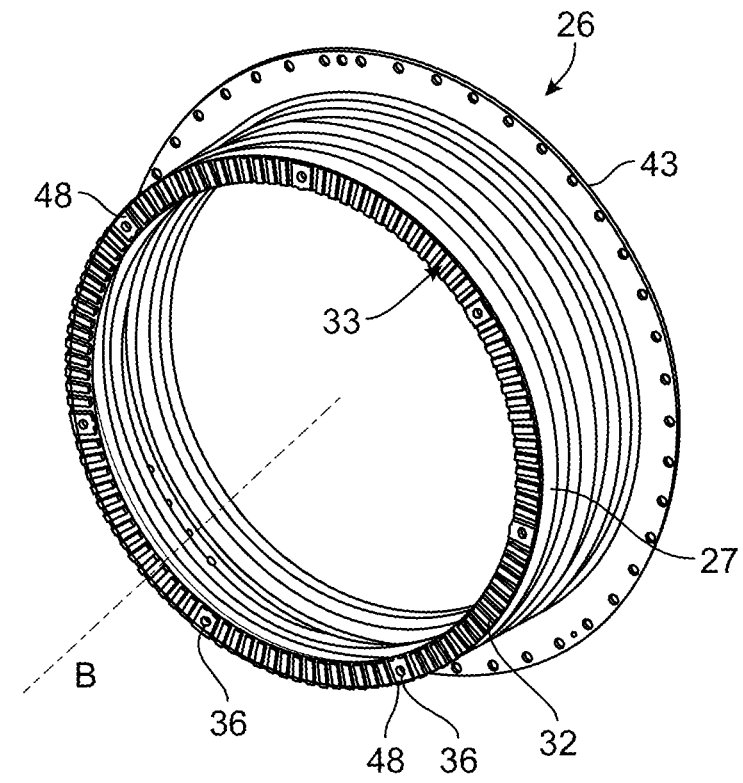
FIG. 6 is a perspective view of an example of a ring gear carrier according to the invention.

Referring to FIGS. 4, 5 and 6, the first attachment flange 25 of the ring gear 24 cooperates with the second attachment flange 27 of the ring gear carrier 26. The first attachment flange 25 and the second attachment flange 27 form an attachment assembly. Advantageously, the attachment flange 27 of the ring gear carrier 26 and the attachment flange 25 of the ring gear 24 are coupled together by a gear coupling of the curvic coupling type. On the one hand, such a configuration offers a greater force transmission capacity than flanges that are screwed on, and on the other, saves weight by reducing the number of attachment means.

The gear coupling of the curvic coupling type can be used between the flanges of the stationary parts, i.e., the ring gear 24 and the ring gear carrier 26 of the epicyclic type speed reducer, and also between the flanges of the movable parts, i.e., the ring gear 24 and the ring gear carrier 26 of the planetary type speed reducer.

The gear coupling must take into account the forces to be transmitted, the evacuation of a lubricant from the speed reducer, generally located at the level of the flange of the ring gear 24, and the attachment of the flanges of one or more members of the speed reducer or of the turbomachine. More precisely, there must be enough teeth for the forces to pass through, while leaving space for the piercings or holes intended to the evacuation of the lubricant and of the attachment members between the parts.

With reference to FIG. 5, the ring gear (or the two half-ring gears) 24 comprises an axis of revolution A which is coaxial with the axis of the turbomachine. The first attachment flange 25 extends radially from a radially external surface 24c. The opposite radial internal surface comprises propellers 35 that mesh with the teeth of the planet gears 22.

With reference to FIGS. 4 to 6, the first attachment flange 25 of the ring gear 24 comprises a first series of teeth 29 (more precisely visible in FIG. 4). In the example shown, the teeth 29 are evenly distributed around the longitudinal axis X. As can also be seen in this example, the teeth 29 extend along the longitudinal axis, projecting from a first radial face 30 of the first attachment flange 25. In particular, in the case of the two half-ring gears, the attachment half-flange 24bb comprises the first radial face 30 provided with the teeth 29. The first radial face 30 delimits the bottom of the hollows between each tooth 29.

Advantageously, but without limitation, each axial coupling tooth 29 extends radially over the entire height of the first attachment flange 25. Advantageously, the teeth 29 are straight. Of course, the teeth 29 could be any other shape, such as trapezoidal, for example.

Advantageously, but not restrictively, the first attachment flange 25 comprises orifices 31, each of which has an axis parallel to the longitudinal axis. The orifices 31 are evenly spaced around the longitudinal axis. The number of orifices is less than the number of teeth 29. The orifices 31 are arranged between a predetermined number of teeth 29. An advantageous characteristic is that the number of orifice is between 5 and 10. In the example shown, there are seven orifices 31 positioned between seven assemblies of teeth. For example, there are fourteen teeth in each assembly of teeth 29.

Referring to FIG. 6, the second attachment flange 27 of the ring gear carrier 26 comprises a second series of axial coupling teeth 32 complementary to the first series of teeth 29. The teeth 29 and complementary teeth 32 face each other. In particular, the teeth are intended to engage with each other. In this way, the complementary teeth 32 are arranged around the longitudinal axis and extend axially projecting from a radial face 33 of the second attachment flange 27 of the ring gear carrier 26. In other words, the teeth 29 and complementary teeth 32 extend along the longitudinal axis (they are axial teeth). The complementary teeth 32 also extend over the entire height of the second attachment flange 27.

The teeth and the complementary teeth 32 are arranged in contact with each other to transmit a torque towards the stator of the turbomachine (if the speed reducer is epicyclic).

In FIG. 4 in particular, in the present example, each tooth 29 and complementary tooth 32 comprises two sides 34a, 34b which extend along the longitudinal axis and which are in contact with each other. The sides 34a, 34b are connected by a face 34c defined in a plane perpendicular to the longitudinal axis. The length of the sides 34a, 34b along the longitudinal axis is identical in this example.

As can also be seen in FIGS. 4 and 6, the second attachment flange 27 of the ring gear carrier 26 comprises second orifices 36 which pass through the wall of the latter on either side along the longitudinal axis. The second axial orifices 36 are designed to cooperate with the first orifices 31 of ring gear 24. When installed, the first and second orifices 31, 36 face each other. The number of second orifices is identical to that of the first orifices 31.

Another advantageous characteristic is that each orifice 36 passes through an attachment tooth 48, as shown in FIG. 6. The first and/or the second attachment flange or flanges 25, 27 comprise attachment teeth 48. The attachment teeth 48 are evenly distributed around the longitudinal axis X. Each attachment tooth comprises a tooth height measured radially with respect to the longitudinal axis. Each attachment tooth 48 has a width in a circumferential direction which is greater than that of the complementary coupling teeth 32. In other words, the width of the attachment tooth is measured in a direction transverse to the height of the tooth. The width of each attachment tooth 48 is adapted to the dimensions of the attachment members described below. The attachment teeth can be received in complementarily shaped recesses formed in either of the first and second attachment flanges.

The first and second orifices 31, 36 are designed to allow attachment members 40 to pass through. In other words, the first and second axial orifices 31, 36 are passed through by the attachment members 40. Advantageously, but without limitation, the attachment members 40 are threaded elements of screw-nut type. Of course, the attachment members 40 can be any threaded element cooperating with a clamping element or any other suitable member allowing an easy assembly and disassembly without destroying the parts equipped with them.

The attachment members 40 are arranged so as to clamp the first and second flanges 25, 27 and circumferentially hold each axial tooth of the first series of teeth between axial teeth of the second series of complementary teeth. Advantageously, the attachment members 40 comprise axially extending screws 41 which apply an axial force to clamp the two attachment flanges and engage the teeth.

The screws 41 each extend between adjacent teeth and complementary teeth 29, 32 in the circumferential direction.

Figure 7:
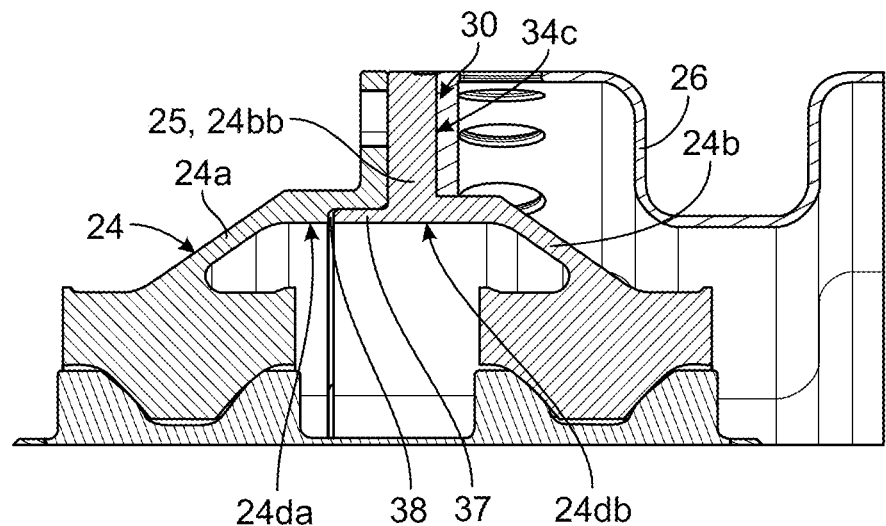
FIG. 7 is an axial sectional view at the level of a gear coupling between a ring gear and a ring gear carrier according to the invention.

FIG. 7 shows that the face 34*c* of a tooth of the first series of the first attachment flange 25 is in contact with the first radial face 30 of the second attachment flange 27. We can also see that the radial height of the second attachment flange 27 is equal to the radial height of the first attachment flange 25. Restrictively, the second attachment flange 27 has a greater height than the first attachment flange.

Also in FIG. 7, the half-ring gear 24*b* comprises a leg 37 which extends parallel to the longitudinal axis X. In this example, the leg 37 is annular. This is nested in a correspondingly shaped recess 38 in the front half-ring gear 24*a*. The recess 38 is formed at the level of a radially internal surface 24*da* of front half-ring gear 24*a* and faces the longitudinal axis. Advantageously, the recess 38 has a height substantially (plus or minus 10 mm) equal to the height of leg 37. The height is measured along the radial axis. Advantageously, the radially internal surface 24*da* has surface continuity with a radially internal surface 24*db* of the rear half-ring gear 24*b* (and of the leg 37). This makes it easier to assemble the half-ring gears and ensures that they are correctly positioned in relation to each other. Alternatively, the recess 38 can be formed at the level of the radially internal surface 24*db* of the rear half-ring gear 24*b* and the leg carried by the front half-ring gear 24*a*.

Figure 8:
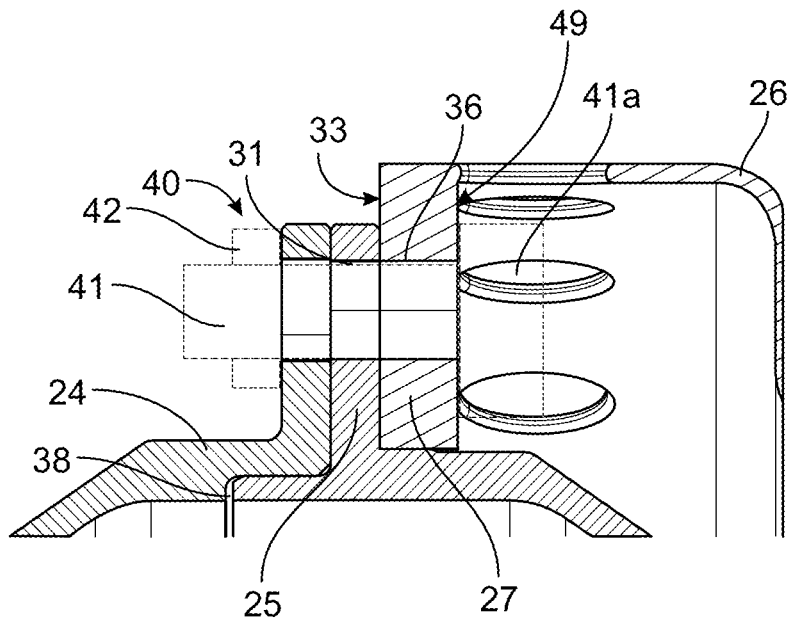
FIG. 8 shows an axial cross-section at the level of a bolted connection between a ring gear and a ring gear carrier according to the invention.

FIG. 8 shows a screw 41 (dotted line) which passes through the first and second orifices 31, 36 respectively in the first and second attachment flanges 25, 27. The head 41*a* of the screw is pressed against a downstream face 49 (opposite the radial face 30) of the second attachment flange 27. A nut 42 (shown in dotted line) is mounted on the threaded stem of the screw 41 on the first attachment flange 25 side to allow the screw to tighten the flanges 25, 27.

The number of attachment members 40 is identical to the number of the first and second orifices respectively. With the gear coupling, there is no need for a large number of screws, which could increase the weight of the assembly. Compared with conventional attachment flanges of the prior art using a large number of screws, the gear coupling reduces the number of screws required by around 90%.

For the mounting, simply engage the teeth 29 and complementary teeth 32 of the two flanges and attach the flanges 25, 27 with the screws 41 and nuts 42. The screws remain easily accessible for disassembly and assembly, as there are no additional parts to cover them.

Figure 9:
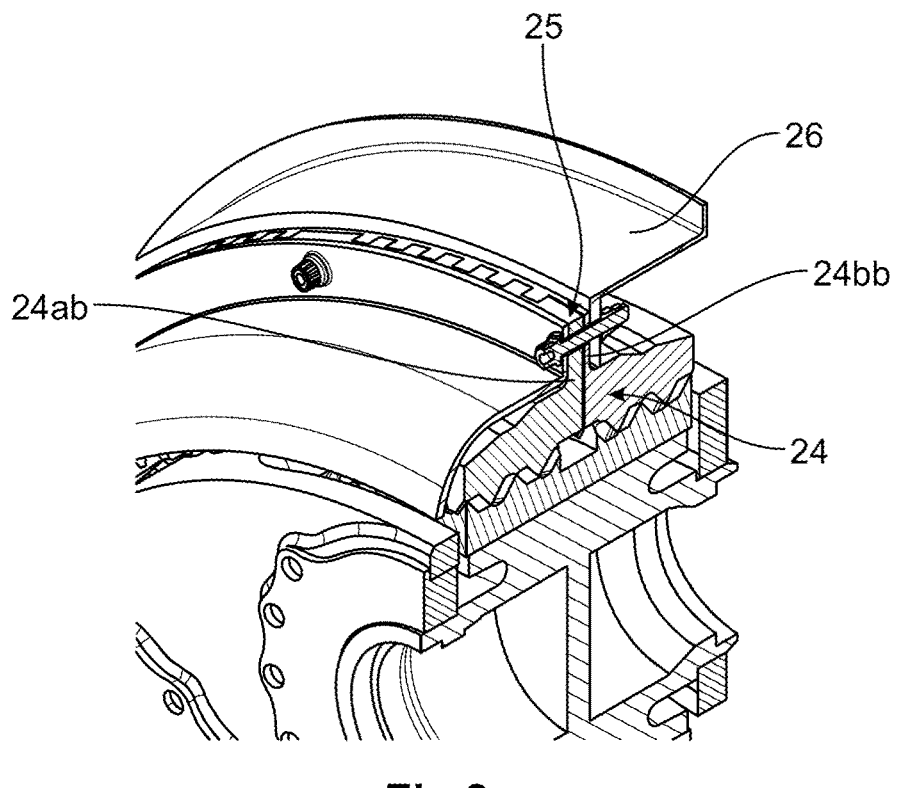
FIG. 9 is a perspective view of another embodiment of a gear coupling between flanges of a member of a speed reducer according to the invention.
Figure 10:
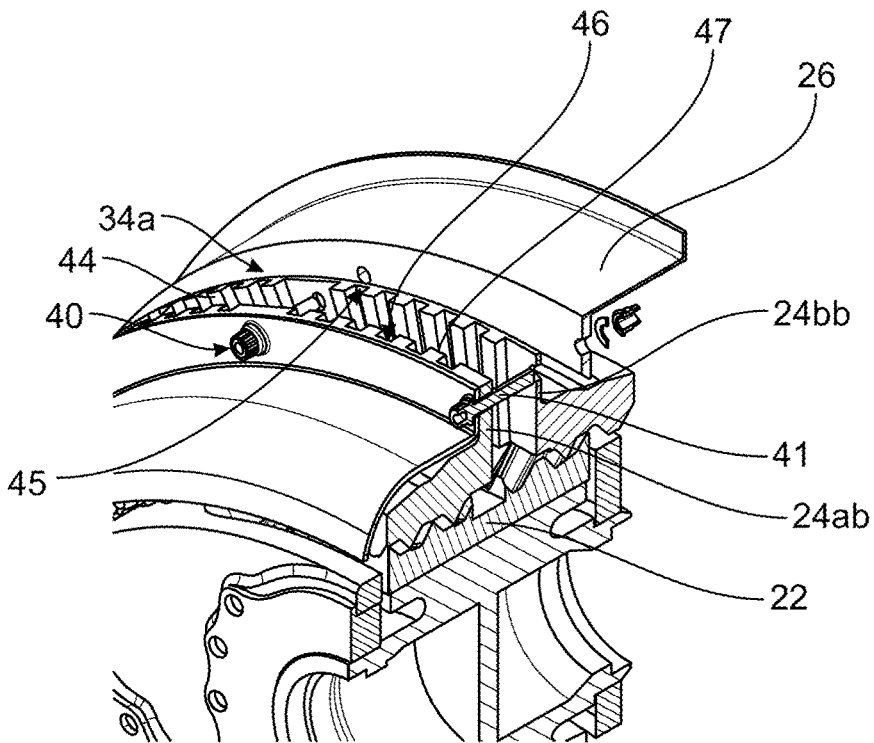
FIG. 10 is a detailed perspective view of FIG. 9.

FIGS. 9 to 10 illustrate one embodiment of the arrangement of a gear coupling. This embodiment differs from that previously described in that the gear coupling with axial coupling teeth is arranged between the two half-flanges

24*ab*, 24*bb* of the external ring gear 24. The rear half-flange 24*bb* comprises a first series of axial coupling teeth, referred to here as internal teeth 44, which extend from a first internal face 45 along the longitudinal axis X. The first internal face 45 extends in a radial plane. The first internal face 45 faces a second internal face 46 of the front half-flange 24*ab*. The front flange half 24*ab* comprises a second series of complementary axial coupling teeth referred to as internal complementary teeth 47 to the internal teeth 44 which extend from the second internal face 46. Of course, the front half-flange 24*ab* can comprise the teeth and the rear half-flange 24*bb* can comprise the complementary teeth. The internal teeth 44 and complementary internal teeth 47 can extend over the entire height or a portion of the height of the flanges. As in the first embodiment, on the one hand the internal teeth 44 engage between the complementary teeth 47 so as to create a gear coupling with axial teeth and on the other hand the attachment members 40 allow the front and rear half-flanges 24*ab*, 24*bb* to be tightened and each internal tooth 44 to be held circumferentially between the complementary teeth 47.

Advantageously, the internal teeth 44 and complementary internal teeth 47 are straight, but could also be trapezoidal. In this embodiment, the attachment flange 27 has no teeth. We understand that the radial face 33 of the second attachment flange 27 is substantially flat and/or smooth.

This configuration increases the passage of forces between the flanges of the ring gear and allows to contain the diameter of the ring gear, which avoids impacting the mass of the speed reducer. Note that the teeth make it easier to mount the two half-ring gears, and in particular the half-flanges, as the teeth nest together naturally. This gear coupling is also more reliable and allows to extend then service life of the ring gear by reducing friction.

Figure 11:
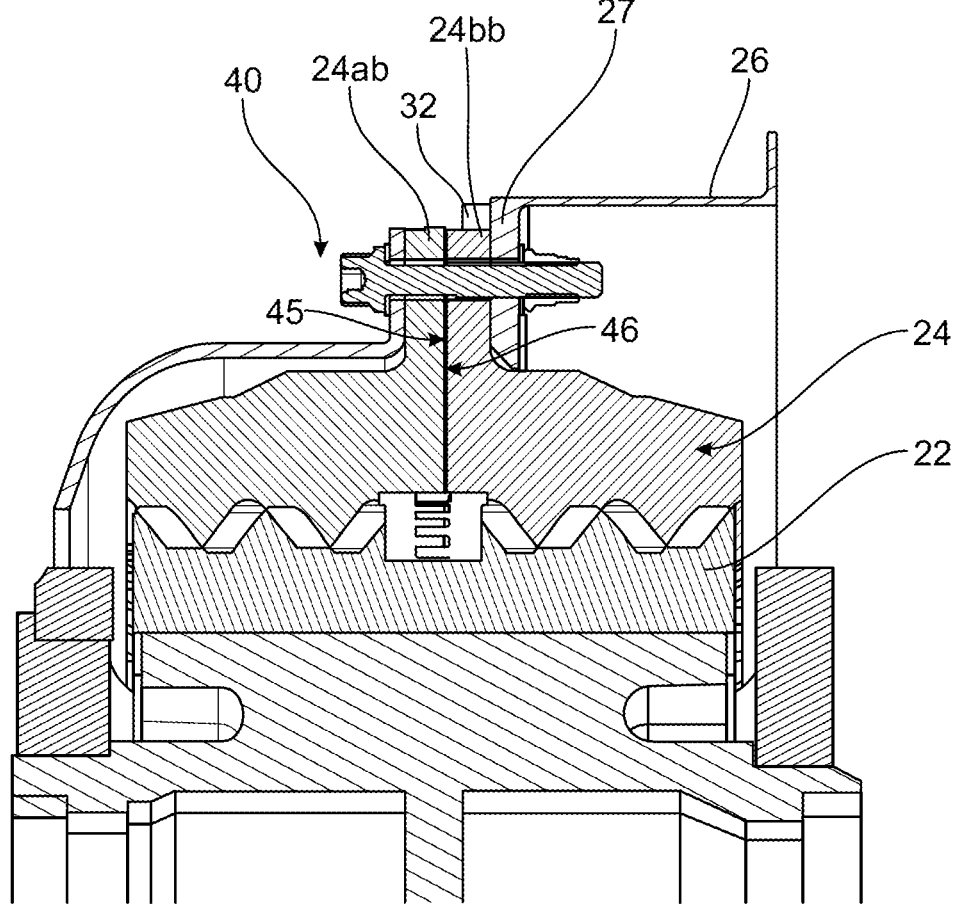
FIG. 11 is an axial cross-sectional view of another embodiment of a coupling between two speed reducer members and the turbomachine according to the invention.
Figure 12:
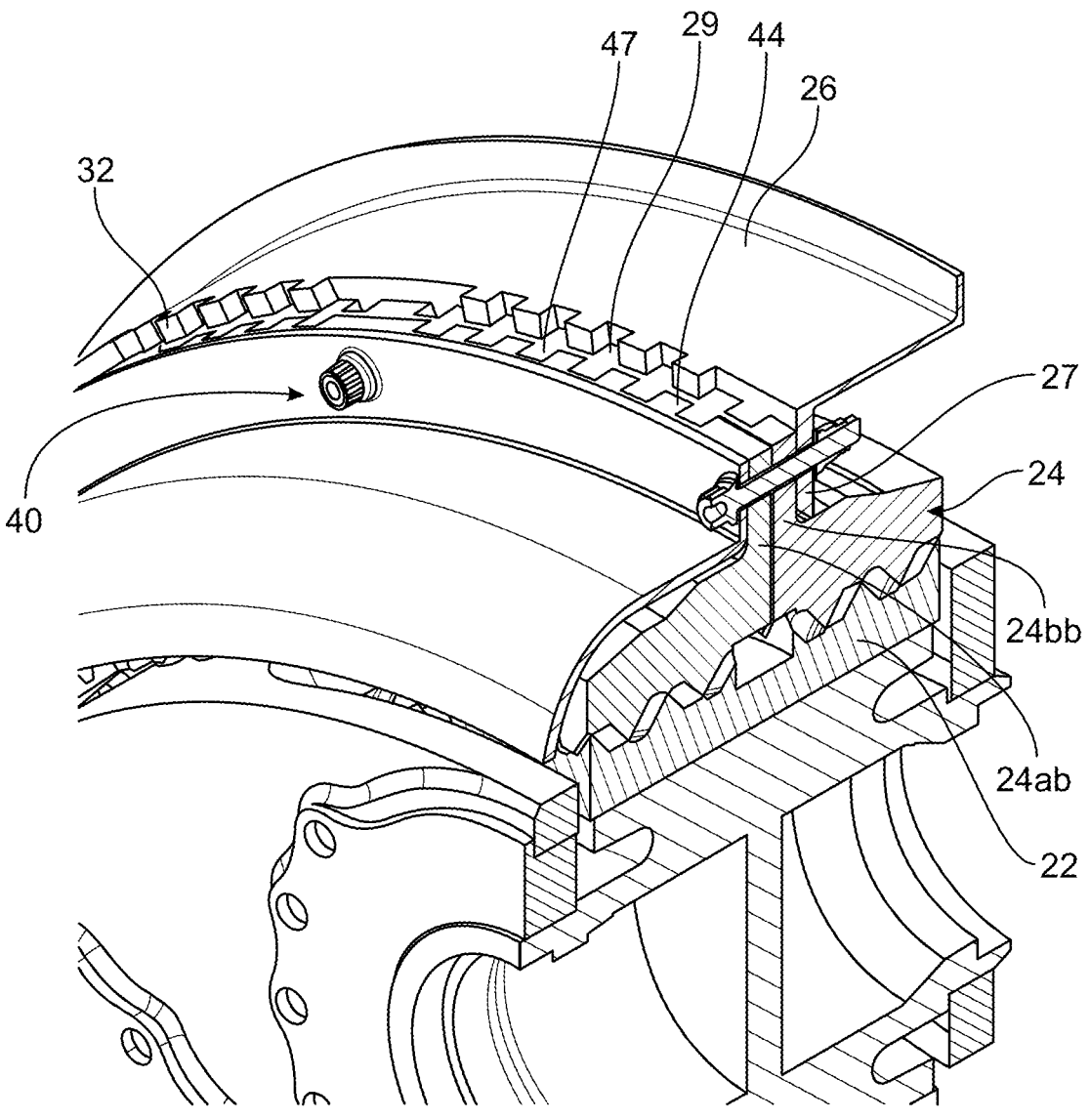
FIG. 12 shows a perspective view of the engagement of the coupling teeth as shown in FIG. 11.
Figure 13:
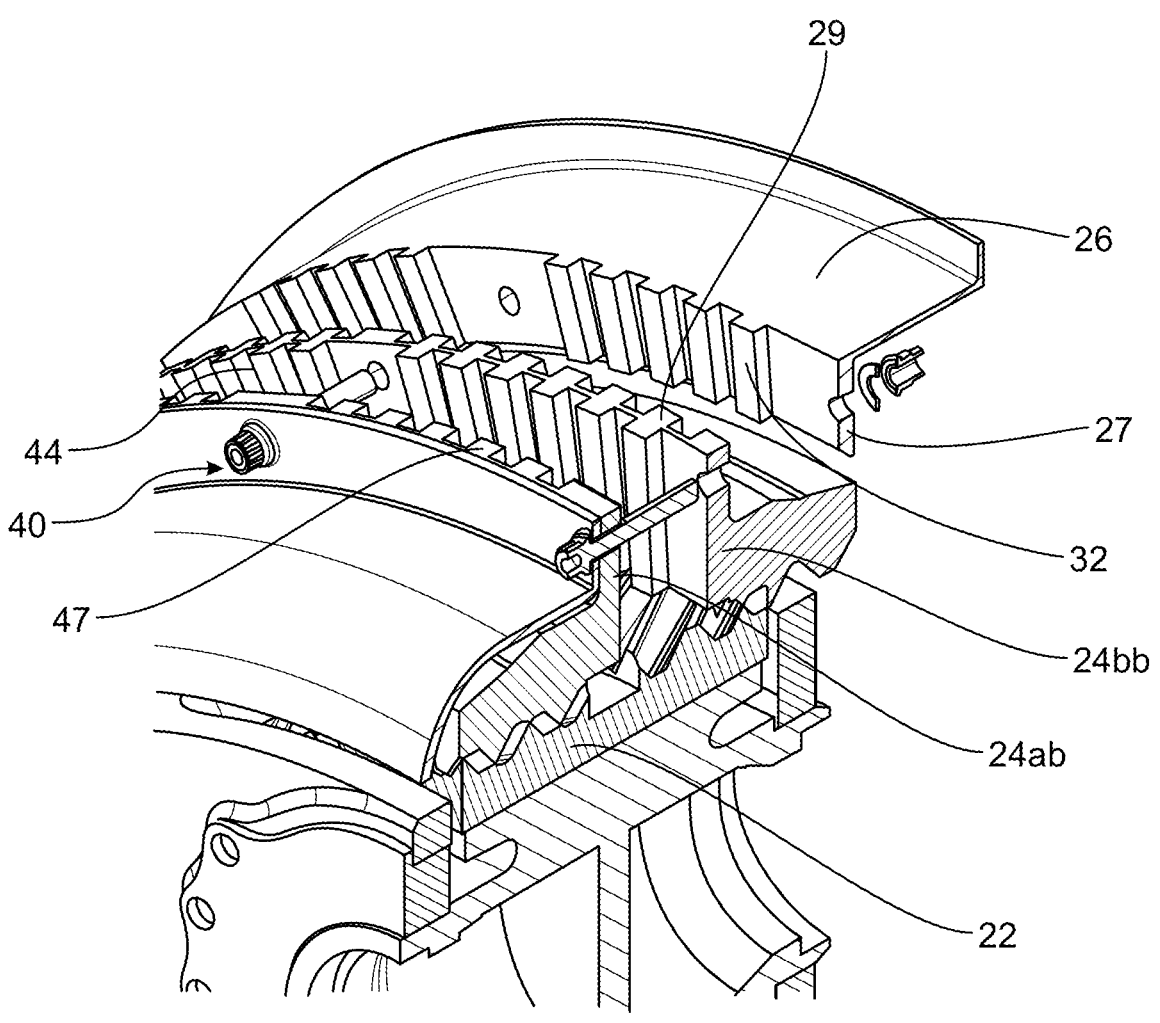
FIG. 13 is a detailed perspective view of FIG. 12.

FIGS. 11 to 13 illustrate yet another embodiment of the arrangement of at least one gear coupling with axial coupling teeth comprising a first series of axial coupling teeth for engagement with a second series of complementary axial coupling teeth. In this embodiment, there is a gear coupling between the half-flange 24*ab*, 24*bb* of the ring gear 24 and a gear coupling between the flange of the ring gear 24 and the attachment flange 27 of the ring gear carrier 26. In particular, the second attachment flange 27 comprises complementary teeth 32 which engage between the teeth 29 of the rear half-flange 24*bb* of the ring gear 24 and the internal teeth 44 of the half-flange 24*bb* engage between the internal complementary teeth 47 of the half-flange 24*ab*. This configuration allows to multiply the forces transmitted between the various flanges. It is possible to increase the torque capacity without affecting the diameter of the various elements. The coupling between the ring gear and the ring gear carrier is also more reliable (less friction and less wear).

The invention claimed is:

1. A speed reducer for a turbomachine, having a longitudinal axis X, the speed reducer comprising a sun gear sprocket, planet gear sprockets, an external ring gear, and a ring gear carrier attached to the external ring gear, the planet gear sprockets being in mesh on the one hand with the sun gear sprocket and on the other hand with the external ring gear, and the external ring gear comprising a first attachment flange extending radially outwards and being attached to a second attachment flange of the ring gear carrier by attachment members, the first attachment flange and the second attachment flange forming an attachment assembly, wherein the attachment assembly comprises at least one gear coupling with axial coupling teeth comprising a first series of axial coupling teeth engaging with a second series of complementary axial coupling teeth, the attachment members being arranged so as to clamp the first and second attachment flanges together and circumferentially hold each tooth of the first series of axial coupling teeth between two teeth of the second series of complementary axial coupling teeth, wherein the first flange and the second flange each comprise axial attachment teeth which are passed through by attachment orifices receiving attachment members.

2. The speed reducer according to claim 1, wherein the external ring gear consists of a front half-ring gear and a rear half-ring gear, the front half-ring gear comprising a front radial half-flange and the rear half-ring gear comprising a rear radial half-flange, the front radial half-flange and the rear radial half-flange forming the first attachment flange, the rear radial half-flange of the rear half-ring gear being connected to the second attachment flange by a gear coupling with axial coupling teeth, the rear radial half-flange of the rear half-ring gear comprising the first series of axial coupling teeth and the second attachment flange comprising the second series of complementary axial coupling teeth.

3. The speed reducer according to claim 1, wherein the external ring gear is formed by a front half-ring gear and a rear half-ring gear, the front half-ring gear comprising a front radial half-flange and the rear half-ring gear comprising a rear radial half-flange, the front radial half-flange and the rear radial half-flange forming the first attachment flange, the front and rear radial half-flanges being connected together by a gear coupling with axial coupling teeth, one of the front and rear radial half-flanges comprising the first series of axial coupling teeth and the other of the front and rear radial flanges comprising the second series of complementary axial coupling teeth.

4. The speed reducer according to claim 1, wherein the first attachment flange and the second attachment flange respectively comprise first and second axial attachment orifices through which the attachment members pass, the first and second axial attachment orifices being arranged circumferentially around the longitudinal axis X.

5. The speed reducer according to claim 4, wherein the attachment members comprise axial screws or axial bolts passing through the first and second attachment orifices.

6. The speed reducer according to claim 4, wherein several teeth of the first or second series of axial coupling teeth are arranged between two circumferentially adjacent first or second attachment orifices around the longitudinal axis X, the number of first or second attachment orifices being between 5 and 10.

7. The speed reducer according to any claim 1, wherein the ring gear carrier comprises a bellow.

8. The speed reducer according to claim 1, wherein the axial attachment teeth have, on the one hand, a tooth height measured radially with respect to the longitudinal axis X and, on the other hand, a tooth width measured in a direction transverse to the tooth height, the width of each of the axial attachment teeth being greater than the tooth width of the axial coupling teeth.

9. The speed reducer according to claim 1, wherein the axial coupling teeth extend over the entire radial height of the first and second attachment flanges.

10. The speed reducer according to claim 4, wherein one of the front and rear half-ring gears comprises a leg extending along the longitudinal axis and housed in a recess of complementary shape to the other of the front and rear half-ring gears.

11. The speed reducer according to claim 1, wherein the attachment assembly comprises piercings or holes intended for the evacuation of a lubricant and attachment members between the parts.

12. A turbomachine having a longitudinal axis X, and comprising a speed reducer according to any-claim 1.

13. The turbomachine according to claim 12, wherein the external ring gear is connected to a casing of the turbomachine and is unmovable in rotation relative to the longitudinal axis.

14. The turbomachine according to claim 12, wherein external ring gear is connected to a shaft of the turbomachine and is movable in rotation about the longitudinal axis.

15. The turbomachine according to claim 12, wherein the turbomachine is for an aircraft.

16. The speed reducer according to claim 1, wherein the speed reducer is for an aircraft.

* * * * *